United States Patent
Michelson et al.

[15] 3,679,680
[45] July 25, 1972

[54] PROCESS FOR PREPARING DISUBSTITUTED PYRAZINES

[72] Inventors: Malvin J. Michelson, Poughkeepsie; William P. Doyle, Lagrangeville, both of N.Y.

[73] Assignee: Texaco Inc., New York, N.Y.

[22] Filed: Sept. 3, 1969

[21] Appl. No.: 855,038

[52] U.S. Cl. ....................................................260/250 R
[51] Int. Cl. ........................................................C07d 51/76
[58] Field of Search ............................................260/290 R

[56] References Cited

UNITED STATES PATENTS 3,453,278   7/1969   Ellis ....................................260/250 R

*Primary Examiner*—Nicholas S. Rizzo
*Attorney*—K. E. Kavanagh and Thomas H. Whaley

[57] ABSTRACT

This invention concerns a one step process for preparing alkylated pyrazines comprising contacting aliphatic nitroketones under mild reducing conditions of temperature and pressure with a reducing catalyst such as Raney nickel.

4 Claims, No Drawings

PROCESS FOR PREPARING DISUBSTITUTED PYRAZINES

This invention concerns the preparation of disubstituted pyrazines under mild reaction conditions using nitroketones as starting materials.

More particularly, this invention relates to contacting aliphatic ketones with reducing agents under mild conditions of temperature and pressure to produce alkylated pyrazines in good yield and in a readily isolatable form. The disubstituted pyrazines are useful as intermediates particularly pharmaceutical intermediates. For example, the disubstituted pyrazines like other pyrazines can be reduced with sodium and alcohol to the corresponding piperazines which are useful as paracides in domestic animals.

Recently during the course of exploratory work on the reduction of aliphatic nitroketones to aminoketones, it was discovered that if the "reduction" is performed under mild conditions of temperature and pressure, disubstituted pyrazines are produced, instead of the expected reduction products, the aminoketones. Not only are yields good, but the process proceeds quite rapidly and produces the product relatively free from contaminants and in a readily isolatable form. Inasmuch as the starting materials of the inventive process are aliphatic nitroketones which will become increasingly available products, this process offers an attractive alternative to preparative process of the prior art.

Thus it is an object of this invention to provide a heretofore unknown preparative route to disubstituted pyrazines starting with aliphatic nitroketones.

Another object of this invention is to provide a one step process for preparing said disubstituted pyrazines in good yield in a readily isolatable form that lends itself to simplified purification procedures.

The above objects among others are achieved by the process described more fully below:

In practice an aliphatic nitroketone and hydrogen are contacted under mild conditions of temperature and pressure with a catalytic amount of a reducing catalyst until the disubstituted pyrazine is produced in an isolatable form.

In the favored practice aliphatic nitroketones containing at least four carbon atoms are contacted with a catalystic amount of reducing catalyst in an inert solvent environment under temperatures ranging from 15° to 80° C., under positive pressure of hydrogen gas ranging from 30 to 200 p.s.i.g. until hydrogen intake substantially ceases and separating the disubstituted pyrazine contained therein.

In the preferred practice a mixture aliphatic nitroketones containing 10 to 24 carbon atoms are contacted with a catalytic amount of Raney nickel catalyst in inert solvent environment at temperatures ranging from 25° – 60° C. under positive pressure generated by hydrogen gas at pressures ranging from 60 – 150 p.s.i.g., until hydrogen intake substantially ceases and separating the disubstituted pyrazine contained therein.

To better aid in the understanding of this invention, the following additional disclosure is submitted.

Mild Reducing Conditions — This term as used herein refers to relatively mild (low) conditions of temperature and hydrogen pressure required to produce the products of this invention.

1. Temperature — Good yields have been obtained when temperatures ranging from about 15° to 80° C. are employed. Inasmuch as temperatures of from about 25° to 60° C. give the most favorable combination of short reaction times and good yields, this represents the preferred range of temperatures.

2. Pressure — As disclosed earlier the inventive process must be run in the presence of hydrogen gas under positive pressure. In fact a convenient means of ascertaining when substantial completion of the reaction has taken place is to follow hydrogen intake. When hydrogen intake substantially ceases, the preparation is substantially complete. The positive pressure at which the reaction can be run ranges from about 30 to 200 p.s.i.g. with the best results being obtained at the preferred range of 60 to 150 p.s.i.g.

3. Solvent — The solvent employed in this process must be inert to reduction under the mild reducing conditions used and must solubilize the pyrazine product to facilitate separation of insoluble catalyst. Suitable solvents which satisfy these requirements include the aliphatic alcohols and ethers of up to 10 carbon atoms and the aliphatic esters of these alcohols containing up to 12 carbon atoms. The preferred inert solvents are ethyl acetate, ethanol, isopropanol and diethyl ether.

4. Catalyst — The preferred catalyst of this invention is Raney nickel produced in the usual manner for commerce. Other, but less favored catalysts include platinum black and supported Group VIII metals on such supports as alumina and kieselguhr, where the metal represents 0.1 to 60 percent of the catalyst by weight. When the preferred catalyst or less preferred catalyst are used they must be present in at least a catalytic amount. A catalytic amount varies according to the particular catalyst used. For the purpose of this disclosure, in most instances, a catalytic amount has been found to be at least 1.0 percent by weight of the aliphatic nitroketone used in the reaction, although the noble metals may be used in lesser concentrations. When Raney nickel catalyst is used it will comprise from 10 to 50 percent, preferably from 20 to 40 percent by weight, of the nitroketone employed. Larger quantities of catalyst are not harmful and are primarily limited by cost.

5. Isolation and Purification of Pyrazine Product — Ordinarily after the pyrazine product has been formed, isolation is most easily accomplished by separating the insoluble catalyst (as illustrated by Raney nickel) in the reaction solution. This can be done simply by air filtration through a suitable filter aid such as paper, cloth, glass wool, charcoal or the like. No special precautions are necessary during filtration. Alternatively, simple decantation may be used to remove the catalyst but the separation is necessarily less complete.

After the insoluble matter has been removed, the filtrate can be handled in several different ways to isolate the crude pyrazine product. For example, the filtrate can be evaporated down preferably under a vacuum of about 100 mm and lower to remove solvent and volatiles. Or the filtrate can be fractionated under vacuum to bypass the evaporation step.

The crude preparation can be used as produced for certain purposes or it can be further purified particularly where pharmaceutical end-use is anticipated. In any event recrystallization (if the pyrazine is a solid), extraction, chromatography or other well known methods of purifying pyrazines can be employed. Applicants have found that chromatographic separation over alumina, silica and the like can be used to produce a highly purified disubstituted pyrazine product. When chromatographic purification is employed solvents such as ethylacetate and pentane can be used to place the non-liquid or liquid crude pyrazines upon the column. For elution aliphatic hydrocarbons such as the butanes, pentanes and hexanes or their mixtures can be satisfactorily used.

The preferred separation procedure is to filter off the Raney nickel or other catalyst from the reaction solution, followed by vacuum stripping of solvent and volatiles, then purifying by passing through a highly purified alumina column using a pentane eluent.

The above description generally describes the workings of this inventive process. In order to more specifically describe the novel process, the following illustrative examples are submitted. Unless otherwise noted all percentages and parts are by weight rather than volume.

Example 1 — Preparation of 2,5-Di-n-decylpyrazine

A 15 gram portion of 1-nitro-2-dodecanone is dissolved in 180 grams of ethyl acetate to form a reaction mixture. The mixture is placed in a Parr reactor bottle with 6 grams of Raney nickel catalyst prepared as disclosed by Vogel on pages 807–808 of his "Textbook of Practical Organic Chemistry," 2nd Edition, Longmans, Green & Co., N.Y. (1948 Edition). The reactor bottle is shaken for 3 hours at 22° C. at 60 p.s.i.g. of hydrogen. At the end of this time when hydrogen intake substantially ceases, the Raney nickel is filtered off and the ethyl acetate filtrate is evaporated under vacuum to give 8.8 grams of a black oil with I.R. absorbencies consistent with a pyrazine structure. The oil is chromatographed over chromatographic grade alumina and is eluted off with pentane. A white solid is obtained whose nuclear magnetic resonance data confirms to 2,5-di-n-decylpyrazine.

In a comparable run using the same reagents in the same quantities, the resulting ethyl acetate filtrate is purified by vacuum distillation to give a produce identical in its properties to the 2,5-di-n-decylpyrazine.

Example 2 — Preparation of 2,5-Di-n-pentyl-pyrazine

A 25 gram portion of 1-nitro-2-heptanone is dissolved in 300 grams of anhydrous ethanol contained in a pressurized reactor equipped with heating and agitation means. A 9 gram portion of the Raney nickel catalyst of Example 1 is added and the reactor is heated to 60° C at 100 p.s.i.g. of hydrogen. After 4 hours hydrogen intake substantially ceases and the reaction is stopped. After filtering off the catalyst, the ethanol is stripped off under vacuum to produce a dark colored crude product. The product is purified by absorbing on chromatographic grade alumina and eluting with pentane. A product is obtained which N.M.R. and I.R. confirm to be the desired product, 2,5-di-n-pentylpyrazine.

Example 3 — Preparation of Mixed 2,5-Dialkylated-pyrazines

In this preparation a 25 gram portion of mixed 1-nitro-2-$C_{10}$ –$C_{14}$ alkyl ketones is dissolved in 350 grams of ethyl acetate in a Parr reactor bottle and 9 grams of the Raney nickel catalyst of Example 1 is added to the solution. The reactor bottle is shaken for 3½ hours at 50° C. under a positive hydrogen pressure of 60 p.s.i.g. At the end of this time hydrogen intake is substantially complete and the reaction is ended. The catalyst is removed by filtration and the ethyl acetate filtrate is evaporated, the residue is chromatographed over alumina and eluted off with pentane. A purified mixture of products is obtained which nuclear magnetic resonance and infrared analysis establish to be a mixture of 2,5-di-$C_8$ –$C_{12}$ alkylated pyrazines.

The preparation procedure and separation described above is repeated exactly on a 25 gram portion of 1-nitro-2-$C_{12}$–$C_{18}$ alkylketones. After hydrogen intake is completed, the work-up and chromatographic purification procedure produce a purified product which N.M.R. and I.R. confirm to be 2,5-di-$C_{10}$–$C_{16}$ alkylated pyrazines. As the preceding specification indicates, the inventive process is both advantageous and unexpected. For example, the novel process is advantageous in that dialkylated pyrazines, particularly the 2,5-dialkylated pyrazines are produced in good yield and in a form which enables the crude product to be readily separated from the reaction mixture and purified using standard techniques of the art. Further advantages are that only one preparative step (reduction is required and the aliphatic nitroketone starting materials are readily available from the nitroxidation of olefins The inventive process is surprising in that the 2,5-dialkylated product is prepared rather than the expected aliphatic amino ketone. Further the reaction conditions employed during reduction are quite mild to achieve the desired hydrogenation and the cyclization that must take place to form the pyrazine products.

As the preceding examples and discussion documents suggest numerous changes, modifications and substitution can be effected without departing from the inventive concept. The metes and bounds of this invention can best be gleaned by the claims which follow, taken in conjunction with the preceding specification.

What is claimed is:

1. A process for preparing symmetrical dialkylated pyrazines having two saturated aliphatic substituents on the 2 and 5 positions of the pyrazine ring, each of said saturated aliphatic groups containing from five to 16 carbon atoms, comprising contacting 1-nitro-2-alkanones wherein the alkyl portion of the alkanone contains from seven to 18 carbon atoms, in inert solvent selected from the group of solvents consisting of ethyl acetate and ethanol, with a catalytic quantity of Raney nickel catalyst, at temperatures ranging from 25° to 60° C., under positive pressures of hydrogen gas ranging from 60 to 100 p.s.i.g., until said symmetrical dialkylated pyrazines are formed and separating said symmetrical pyrazines contained therein.

2. The process of claim 1 wherein the 1-nitro-2-alkanone is in the form of discrete single compounds.

3. The process of claim 1 wherein the 1-nitro-2-alkanone is in the form of a mixture of compounds.

4. The 2,5-dialkylated pyrazines formed by the process of claim 1.

* * * * *